United States Patent
Matsuzaki et al.

(10) Patent No.: US 7,833,670 B2
(45) Date of Patent: Nov. 16, 2010

(54) FUEL CELL SYSTEM AND METHOD OF SHUTTING DOWN THE SAME

(75) Inventors: Takeo Matsuzaki, Tokyo (JP); Mitsugu Takahashi, Tokyo (JP); Kazuhiko Kawajiri, Tokyo (JP); Yoshiaki Odai, Tokyo (JP); Kazunori Tsuchino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1243 days.

(21) Appl. No.: 11/143,684

(22) Filed: Jun. 3, 2005

(65) Prior Publication Data
US 2006/0188765 A1    Aug. 24, 2006

(30) Foreign Application Priority Data
Feb. 24, 2005    (JP) ............................. 2005-048452

(51) Int. Cl.
*H01M 8/04* (2006.01)
*H01M 8/06* (2006.01)
(52) U.S. Cl. ...................................................... 429/429
(58) Field of Classification Search .................. 429/13, 429/19, 23, 427–429
See application file for complete search history.

(56) References Cited
U.S. PATENT DOCUMENTS
6,399,231 B1    6/2002    Donahue et al.

FOREIGN PATENT DOCUMENTS
JP    09199150 A    *    7/1997
JP    11-26003    1/1999

OTHER PUBLICATIONS
IPDL Machine Translation of JP 09-199150.*

* cited by examiner

*Primary Examiner*—Gregg Cantelmo
(74) *Attorney, Agent, or Firm*—Oblon, Spivak, McClelland, Maier & Neustadt, L.L.P.

(57) ABSTRACT

The output of a fuel cell stack is kept consumed in an external load through a power converter having a constant-current operating function for keeping an output current of the fuel cell stack at a constant value, until an output voltage of the fuel cell stack reaches an operable lower limit voltage value of the power converter after stopping the supply of oxidant-containing gas to a cathode while maintaining the supply of hydrogen-containing gas to an anode. When the output voltage of the fuel cell stack falls below the operable lower limit voltage value, the output of the fuel cell stack is connected to a short-circuit resistor. Thereafter, a reformer is stopped when the output voltage of the fuel cell stack reaches approximately zero.

4 Claims, 5 Drawing Sheets

FUEL CELL SYSTEM AND METHOD OF SHUTTING DOWN THE SAME

BACKGROUND OF THE INVENTION

1. Field of the Invention

The present invention relates to a fuel cell system for producing electricity by using an electrochemical reaction.

2. Description of the Background Art

It is known that, when shutting down a fuel cell system with air remaining on a cathode side, a catalyst forming a cathode catalyst layer is deactivated, resulting in electrode performance degradation. More specifically, in an exemplary case where platinum catalyst particles serving as a catalyst are held by carbon particles, the carbon particles react with oxygen present in incoming air, then turn into carbon monoxide and disappear, while the platinum catalyst particles are separated from the carbon particles and are flocculated together, so that the catalyst loses conduction with the cathode electrode and thus loses its catalytic function. To avoid such degradation, a shutdown method is known which includes shorting the output of a fuel cell to a resistor when stopping electricity production, stopping the supply of air to the cathode, and completely consuming air remaining on the cathode (cf. Japanese Patent Application Laid-Open No. 11-26003 (1999)).

Shorting the fuel cell output to the resistor while stopping the supply of oxygen to the cathode mainly produces the following reactions (1) and (2) on the cathode:

$$2H^+ + (1/2)O_2 + 2e^- \rightarrow H_2O \quad (1)$$

$$2H^+ + 2e^- \rightarrow H_2 \quad (2)$$

The reaction (1) is dominant when there is oxygen of relatively high concentration for some time after the start of cutting off the supply of air, and the reaction (2) is dominant after the concentration of oxygen is lowered. The reaction (2) produces hydrogen on the cathode, causing the potential around the catalyst to drop, which prevents oxidization of the catalyst. Therefore, shutting down and storing the fuel cell in this state is a countermeasure against the above-described degradation.

Experiments conducted by the inventors of the present invention have revealed that shorting the fuel cell output to a resistor to bring both anode and cathode into an atmosphere of hydrogen and then shutting down and storing the fuel cell with the inlet and outlet of each of the anode and cathode closed not only prevents catalyst degradation, but also advantageously allows a degraded catalyst to be activated again (a publicly-unknown technique). This is considered because, when a catalyst is covered with such an oxide that reduces the catalytic powers, the oxide is reduced by hydrogen. Accordingly, consideration will be given to an application of this publicly-unknown shutdown and storage method to a system provided with a reformer for producing a fuel to be supplied to a fuel cell, from a raw fuel.

To apply the above-mentioned publicly-unknown shutdown and storage method of maintaining both anode and cathode in an atmosphere of hydrogen to a system for supplying fuel from a reformer to an anode, fuel needs to be supplied from the reformer to the anode until oxygen on the cathode is consumed to lower the concentration of oxygen, so that hydrogen is produced on the cathode. In this case, when the output is connected to a resistive load upon stopping the supply of air similarly to the background art, stack current decreases in proportion to stack voltage, reducing the amount of consumption of hydrogen on the anode, so that the amount of hydrogen contained in an anode off-gas increases. Further, it takes relatively much time to remove the residual oxygen on the cathode, which increases the operating time of the reformer after stopping the supply of air. Therefore, an excessive amount of hydrogen contained in the off-gas, which is a fuel, is burned with an off-gas burner of the reformer for a long while, causing a problem of abnormal temperature rise in the reformer.

SUMMARY OF THE INVENTION

An object of the present invention is to provide a fuel cell system capable of preventing abnormal temperature rise in a reformer when stopping electricity production as well as bringing both electrodes into an atmosphere of hydrogen, thereby preventing catalyst degradation and achieving activation of a degraded catalyst.

The fuel cell system according to the present invention includes a fuel cell, an oxidant-containing gas supply path, a reformer, a power converter, a first switch, a short-circuit resistor, a second switch and a current-value control section. The fuel cell includes a cathode and an anode. Along the oxidant-containing gas supply path, an oxidant-containing gas is supplied to the cathode. The reformer produces a hydrogen-containing gas from a raw fuel and supplies the hydrogen-containing gas to the anode. The power converter includes an output terminal connected to an external load, and includes a function of converting an output of the fuel cell to power according to an application as well as a constant-current operating function. The first switch is connected in series to the power converter. The second switch is connected in series to the short-circuit resistor. The current-value control section controls a current value output from the fuel cell.

A pair of the power converter and the first switch is connected between the cathode and the anode. A pair of the short-circuit resistor and the second switch is also connected between the cathode and anode.

When stopping electricity production by the fuel cell, the current-value control section outputs a current command value to the power converter as well as keeps the first switch on and the second switch off to cause the output of the fuel cell to be consumed in the external load through the power converter during a time period after stopping the supply of the oxidant-containing gas to the cathode while maintaining the supply of the hydrogen-containing gas from the reformer to the anode until an output voltage of the fuel cell reaches a constant threshold value. The current value control section switches the first switch to the off state and the second switch to the on state when the output voltage of the fuel cell falls below the threshold value, and thereafter stops the supply of the hydrogen-containing gas to the anode when the output voltage of the fuel cell reaches approximately zero.

The constant-current operating function of the power converter keeps the output current of the fuel cell at a command value during a period after stopping the supply of oxidant-containing gas until the output of a fuel cell body is connected to the short-circuit resistor, which promotes a reaction between oxygen remaining in the fuel cell body and hydrogen. Thus, the amount of oxygen remaining on the cathode is kept decreasing to a greater degree than in the background art during this period, while the amount of hydrogen in an off-gas on the anode side does not increase but is kept constant during this period. Therefore, it is possible to stop electricity production of the fuel cell body with both the anode and cathode present in an atmosphere of hydrogen while preventing abnormal temperature rise in the reformer. This not only prevents catalyst degradation but also allows a degraded catalyst to be activated during storage. Further, in the period after stopping the supply of oxidant-containing gas until the output of the fuel cell body is connected to the short-circuit resistor, which falls on a time period in which voltage and current are relatively great in value, power in the fuel cell body can be consumed in the external load through the power converter. Therefore, it is also possible to reduce the capacitance of the short-circuit resistor to a greater degree than in the background art.

These and other objects, features, aspects and advantages of the present invention will become more apparent from the following detailed description of the present invention when taken in conjunction with the accompanying drawings.

DESCRIPTION OF THE PREFERRED EMBODIMENTS

Idea of the Invention

A method of shutting down a fuel cell system according to the present invention includes stopping the supply of air to a cathode while maintaining the supply of fuel to an anode at the start of a shutdown procedure, then consuming oxygen remaining on the cathode and producing hydrogen on the cathode while controlling a current value of a fuel cell body with a power converter having a constant-current operating function such that the current value does not decrease with a drop in output voltage, that is, such that the current value falls within a predetermined range (preferably becomes a constant value), and then connecting the output of the fuel cell body from the power converter to a resistive load.

Figure 1:
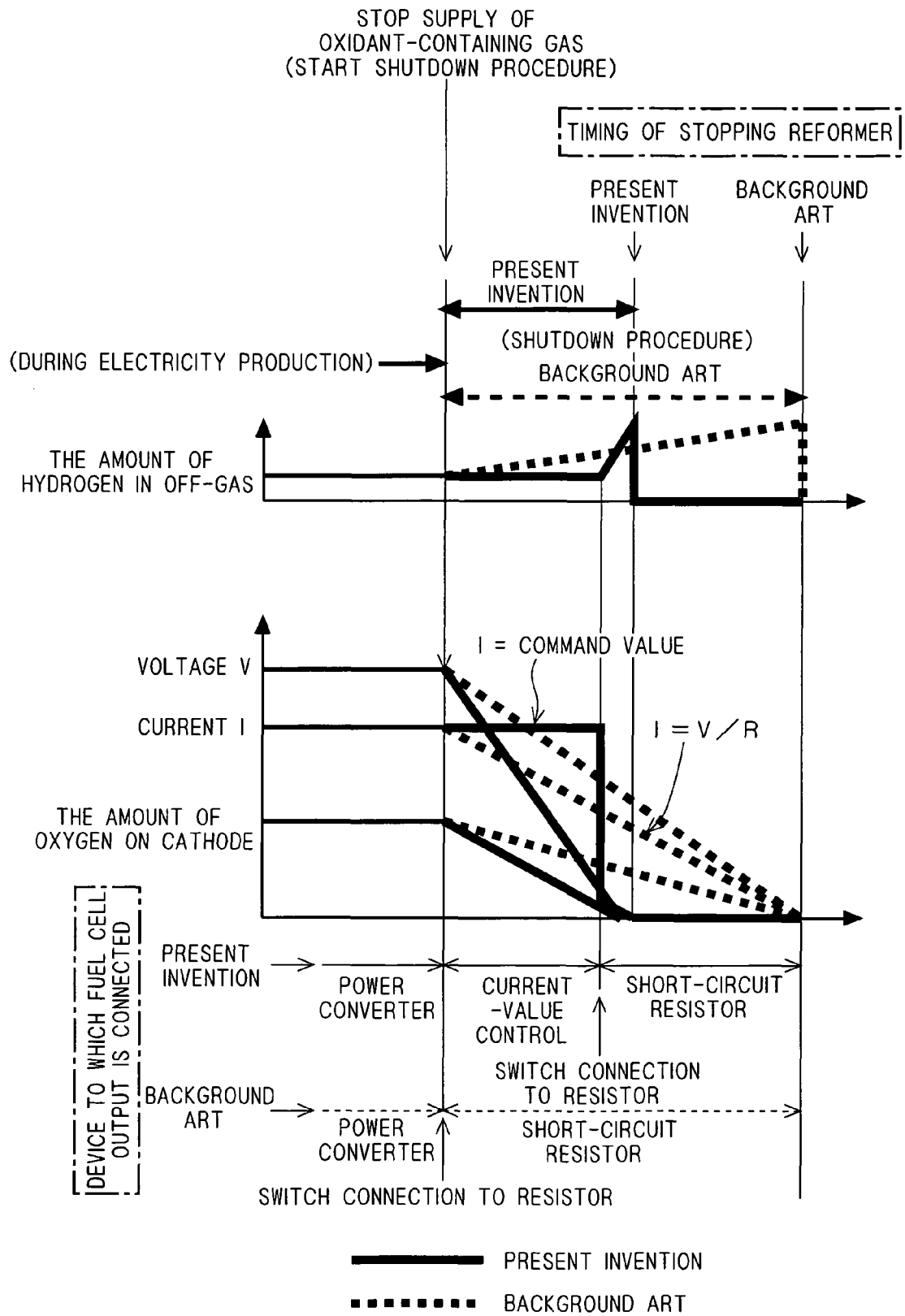
FIG. 1 is a conceptual view schematically showing the idea of the present invention and its effects.

The above will be described in more detail referring to FIG. 1. FIG. 1 conceptually shows changes in the amount of hydrogen in an off-gas, voltage value V in a fuel cell stack (fuel cell body), current value I in the fuel cell stack and the amount of oxygen on the cathode, before and after the stop of electricity production. In FIG. 1, the amounts of substance and states indicated by bold lines are obtained in the present invention, and those indicated by broken lines are obtained in the background art. As indicated by the bold lines in FIG. 1, the current value I is controlled so as not to decrease as the voltage value V drops, that is, so as to fall within a specified range (preferably, to be a constant value) after stopping the supply of oxidant-containing gas to the cathode of the fuel cell stack (in contrast, in the background art, the fuel cell stack output is shorted to a resistor immediately at this point of time, which causes the current value I in the fuel cell stack to decrease in proportion to the voltage value V). Then, oxygen remaining on the cathode is consumed so that hydrogen is produced on the cathode. At the time when both the anode and cathode are brought into an atmosphere of hydrogen, the control of keeping the current value I at a specific value is stopped, and connection of the fuel cell stack output is switched to a short-circuit resistor. Thereafter, a reformer is stopped at the time when the voltage value V reaches approximately zero, to bring the fuel cell system into a non-operating status. The reformer may be stopped when the voltage value reaches exactly zero, but may be stopped before the voltage value V reaches zero in the case where such an amount of hydrogen remains on the anode that hydrogen is produced on the cathode even when the reformer is stopped, allowing both the anode and cathode to have an equal partial pressure of hydrogen and the voltage value V to be reduced to zero. For instance, the timing of stopping the reformer may be determined based on criteria for judgment experimentally determined in consideration of the capacitance of the reformer and the like, such as a requirement that "voltage per cell should be 0.1 V or less". In the case of employing such a shutdown method, the amount of hydrogen contained in the off-gas on the anode side is constant relative to the amount of oxygen on the cathode side decreasing more sharply than in the background art indicated by broken lines during a period in which the current value is kept at a specified value while maintaining the supply of fuel to the anode. This can prevent the abnormal temperature rise in the reformer (whereas, in the background art, the current value I is allowed to freely decrease, resulting in an increase in the amount of hydrogen in the off-gas, which causes the problem of abnormal temperature rise in the reformer). Further, the shutdown method of the present invention flows current of the current value I (preferably, a constant value) greater than in the background art, allowing oxygen remaining on the cathode to react more quickly so that hydrogen is produced on the cathode more quickly. Accordingly, the time from the start of shutdown procedure to the stop of the reformer can further be shortened.

In FIG. 1, there is a period during which the amount of hydrogen contained in the off-gas (the off-gas hydrogen amount) increases after the switching to the short-circuit resistor and is reduced to zero upon stopping the reformer. This period is only a conceptual illustration that hydrogen increases at the instant when switching to the short-circuit resistor of low resistance is made, which, actually, is a very short period. Thus, it is not a problem in terms of temperature rise in the reformer.

The reason why it is preferable that the current value I should be set at a constant value in the above method is as follows: as the current value decreases, the amount of hydrogen consumed on the anode decreases, and the off-gas hydrogen amount increases, which may result in abnormal temperature rise in the reformer. In contrast, as the current value increases, the amount of hydrogen consumed on the anode increases, causing a discharge current to flow with insufficient hydrogen in a cell of the fuel cell stack, which may result in consumption of carbon making up both the anode and cathode. Therefore, it is preferable to keep the current value I flowing between the cathode and anode at a constant value.

First Preferred Embodiment

Figure 2:
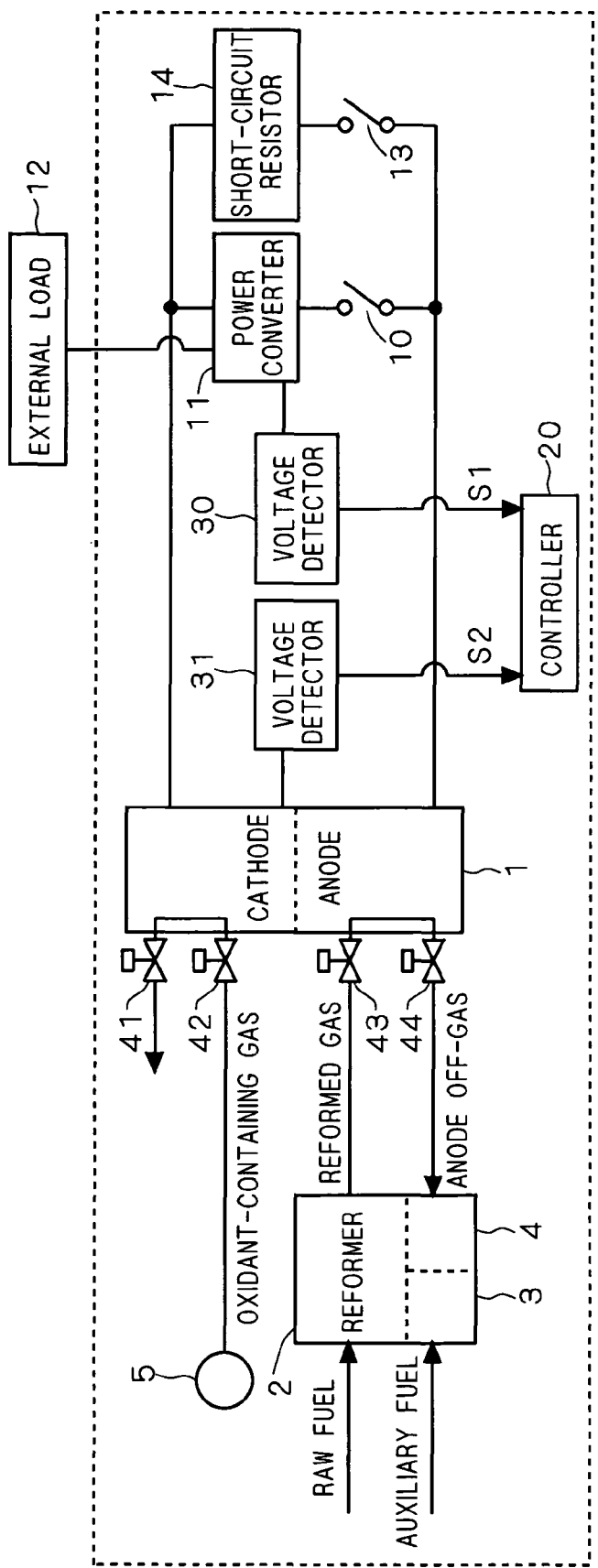
FIG. 2 is a block diagram systematically showing the configuration of a fuel cell system according to each of first to fifth preferred embodiments of the invention.

FIG. 2 is a block diagram systematically showing the configuration of a fuel cell system according to a first preferred embodiment of the present invention. In FIG. 2, the system generally includes a fuel cell stack (made up of a plurality of stacked cells) 1 having a cathode and an anode opposed to each other with an electrolyte (not shown) interposed therebetween, a reformer 2 for producing a hydrogen-containing gas (reformed gas) from a raw fuel and supplying the hydrogen-containing gas to the anode, and an oxidant-containing gas source 5. The oxidant-containing gas source 5 and its valves 42 and 41 constitute an "oxidant-containing gas supply path" along which an oxidant-containing gas such as air is supplied to the cathode.

The oxidant-containing gas and reformed gas are supplied to the fuel cell stack 1 through valves 42 and 43, respectively. The oxidant-containing gas undergone reaction on the cathode of the fuel cell stack 1 is discharged through the valve 41. The reformed gas undergone reaction on the anode of the fuel cell stack 1 is delivered to the reformer 2 as the anode off-gas. To the reformer 2, the raw fuel and auxiliary fuel are supplied, and the anode off-gas is also supplied through the valve 44. The auxiliary fuel and anode off-gas are supplied to a stabilizing burner 3 and an off-gas burner 4 of the reformer 2, respectively.

The system further includes a power converter 11 having a constant-current operating function connected to the output of the fuel cell stack 1 when a (first) switch 10 is in the on state (with its output terminal connected to an external load 12), a short-circuit resistor 14 connected to the output of the fuel cell stack 1 when a (second) switch 13 is in the on state, a (first) voltage detector 30 for outputting a (first) signal S1 when an input voltage from the power converter 11 falls below an operable lower limit voltage value of the power converter 11, a (second) voltage detector 31 for outputting an output voltage of the fuel cell stack 1 (total sum of cell voltages) as a (second) signal S2, and a controller 20 for controlling the system as a whole. The controller 20 outputs a command value for the current value I to be kept constant after starting the stop of electricity production, to the power converter 11. In the present embodiment, the controller 20 and voltage detector 30 constitute a "current value control section". More specifically, the voltage detector 30 outputs the signal S1 when the input voltage from the power converter 11 falls below the operable lower limit voltage value of the power converter 11 which corresponds to a constant threshold value. The controller 20 keeps the first switch 10 on and the second switch 13 off until the signal S1 is received from the voltage detector 30, while switching the first switch 10 to the off state and the second switch 13 to the on state upon receipt of the signal S1 from the voltage detector 30.

During an operation (electricity production) of the fuel cell system according to the present embodiment, the valves 41, 42, 43 and 44 are opened, the switch 13 is opened (off state), the switch 10 is closed (on state), and the output of the fuel cell stack 1 is consumed in the external load 12 connected thereto through the power converter 11.

Figure 3:
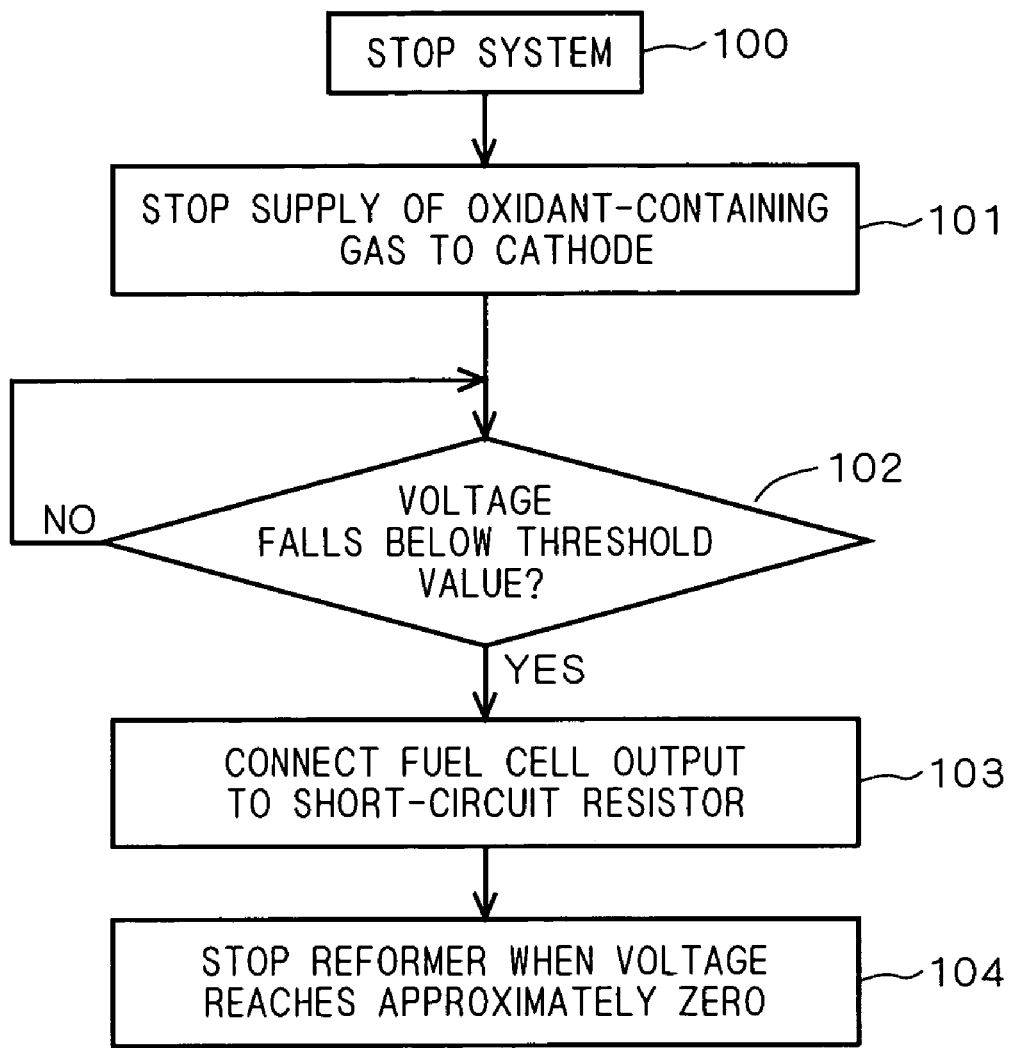
FIG. 3 is a flow chart showing the procedure for shutting down the fuel cell system according to each of the first to fourth preferred embodiments.
Figure 4:
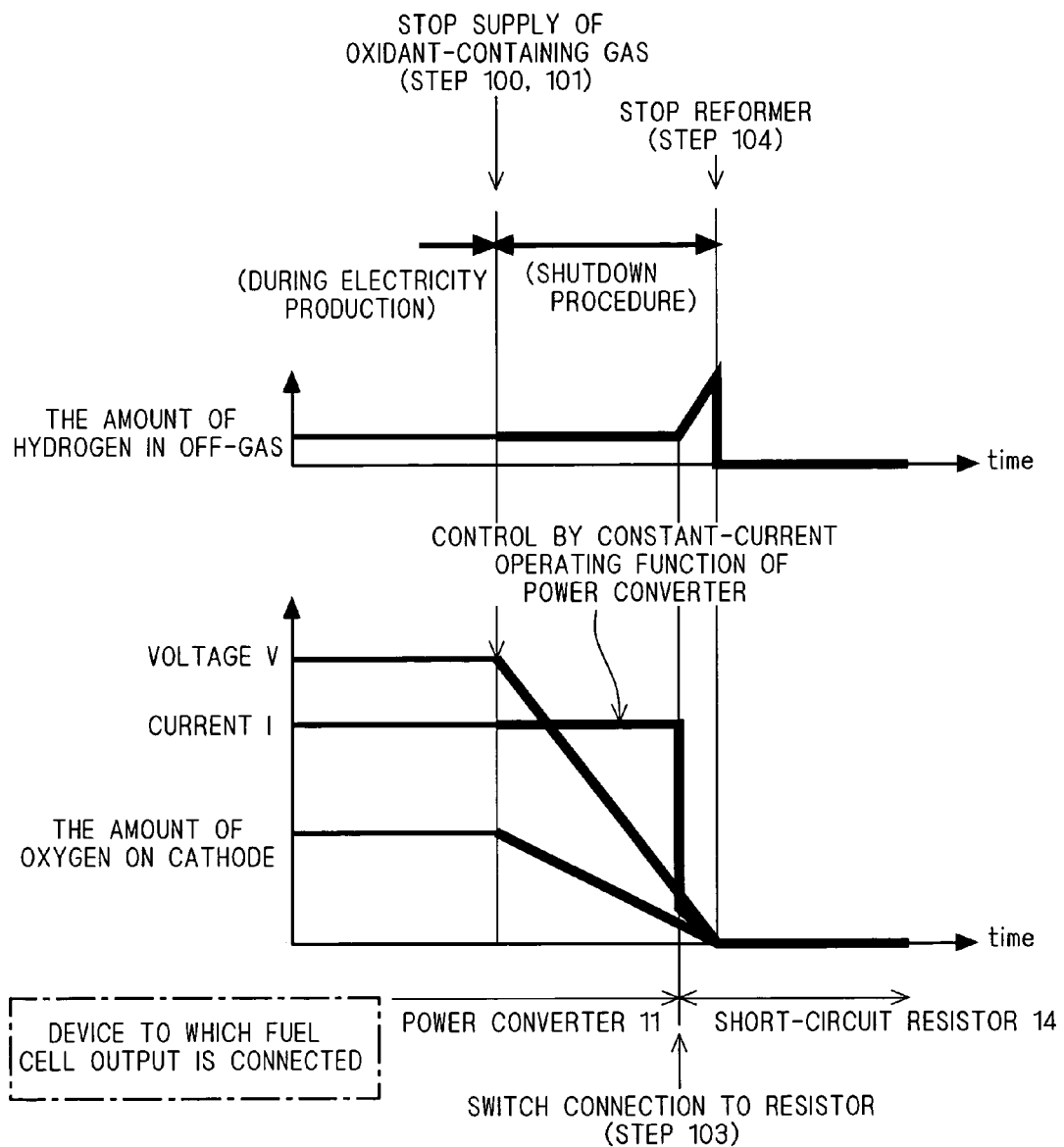
FIG. 4 is a conceptual view schematically showing changes of state in each of the first to fourth preferred embodiments.

Next, an operation for shutting down the system according to the present embodiment will be described referring to FIGS. 3 and 4. FIG. 3 is a flow chart showing the shutdown procedure according to the present embodiment, and FIG. 4 is a conceptual view schematically showing changes of state in output voltage value V and current value I of the fuel cell stack 1, the amount of oxygen on the cathode and the anode off-gas hydrogen amount. FIG. 4 contains step numbers corresponding to those of FIG. 3.

First, the shutdown procedure of the system is started by performing a key input operation or the like to input a shutdown start command signal to the controller 20 (step 100).

Next, the controller 20 reduces the output of the oxidant-containing gas source 5 and closes the valves 41 and 42, thereby stopping the supply of oxidant-containing gas to the fuel cell stack 1 (step 101). Then, the controller 20 sends a current command value for the power converter 11 to achieve its constant-current operating function. Electricity production is continued since a fuel gas (reformed gas) is kept supplied to the anode. The amount of oxygen on the cathode (the concentration of oxidant) decreases with the progress of consumption of the oxidant because of electricity production, causing the output voltage value V of the fuel cell stack 1 to drop. At this time, the constant-current operating function of the power converter 11 controls the output current of the fuel cell stack 1 such that the current value I is kept constant even when the output voltage value V of the fuel cell stack 1 drops.

Thereafter, upon receipt of the signal S1 output from the voltage detector 30, the controller 20 judges that the output voltage value V of the fuel cell stack 1 falling below the operable lower limit voltage value (referred to as "threshold value" in step 102 in FIG. 3) of the power converter 11 has disabled the power converter 11 or has made power consumption in the external load 12 impossible (step 102). The controller 20 opens the switch 10 (off state) and closes the switch 13 (on state), so that the output of the fuel cell stack 1 is connected to the short-circuit resistor 14 (step 103).

Finally, when the output voltage value V of the fuel cell stack 1 reaches approximately zero, the controller 20 stops the reformer 2 and closes the valves 43 and 44 (step 104). As a result, the supply of hydrogen-containing gas (reformed gas) to the anode is stopped.

With the above-described configuration and shutdown procedure, electricity production of the fuel cell stack 1 can be stopped with hydrogen produced on both the cathode and anode (thus preventing catalyst degradation as well as achieving activation of catalyst) without causing abnormal temperature rise in the reformer 2. Further, in accordance with the shutdown procedure according to the present embodiment, power in a time period, just after starting the shutdown procedure, during which voltage and current are great in value can be consumed in the external load 12 through the power converter 11. Accordingly, the capacitance of a resistor used as the short-circuit resistor 14 can be made relatively smaller than in the background art.

In addition, the shutdown method according to the present embodiment advantageously eliminates the need to provide a plurality of resistors and switch the output of the fuel cell stack 1 among the resistors. Accordingly, the system configuration and shutdown procedure can advantageously be simplified.

Second Preferred Embodiment

In the first preferred embodiment, it is assumed that power cannot be consumed when the current value I reaches approximately zero in the power converter 11 shown in FIG. 2, that is, the operable lower limit voltage value of the power converter 11 is assumed to be not small.

However, if the power converter 11 is operable until the current value I reaches approximately zero (if the operable lower limit voltage value is relatively small), the whole power during the shutdown procedure may be consumed in the external load 12 through the power converter 11. In this case, when it is judged "YES" in step 102 shown in FIG. 3, that is, upon receipt of the signal S1, the controller 20 may immediately short the output of the fuel cell stack 1 in step 103 and stop the reformer 2 in step 104.

Therefore, according to the present embodiment, the capacitance of the short-circuit resistor 14 can be made still smaller than in the first preferred embodiment, or alternatively, the short-circuit resistor 14 itself may be omitted.

Third Preferred Embodiment

In the first preferred embodiment, the controller 20 determines the timing of switching to the short-circuit resistor 14 whether or not the signal S1 is received in step 102 of the shutdown procedure shown in FIG. 3. Instead of this method, the controller 20 may determine the timing of switching to the short-circuit resistor 14 judging a drop in output voltage by comparing the value of the signal S2 output from the voltage detector 31 with a predetermined value (which is an experimentally predetermined value and corresponds to the above-mentioned threshold value in the first preferred embodiment). In this case, the voltage detector 30 becomes unnecessary.

More specifically, according to the present embodiment, the voltage detector 31 and controller 20 constitute the "current value control section". Conversely saying, the current value control section includes the voltage detector 31 for detecting the output voltage of the fuel cell stack 1 and outputting the result of detection as the signal S2 and the controller 20 for comparing the value of the signal S2 with the predetermined value corresponding to the constant threshold value, thereby keeping the first switch 10 on and keeping the second switch 13 off until the value of the signal S2 reaches the predetermined value, while switching the first switch 10 to the off state and the second switch 13 to the on state when the value of the signal S2 falls below the predetermined value.

As a matter of course, the aforementioned effects obtained in the first preferred embodiment are also achieved by this embodiment.

Fourth Preferred Embodiment

In the first and second preferred embodiments or third preferred embodiment, the timing of switching to the short-circuit resistor 14 is determined depending on whether or not the signal S1 is received or by comparing the signal S2 with the predetermined value in step 102 of the shutdown procedure, however, the controller 20 may judge a drop in output voltage of the fuel cell stack 1 and thus determine the timing of switching to the short-circuit resistor 14 based on a lapse of a certain time period after the stop of supply of oxidant-containing gas in step 101 (a time period from the stop of supply of oxidant-containing gas until the output voltage value V drops to a predetermined value shall previously be obtained by experiments). In this case, the voltage detectors 30 and 31 become unnecessary, and instead, the controller 20 includes a timer (not shown). Then, the controller 20 itself constitutes the "current value control section" for judging that the voltage value V output from the fuel cell stack 1 falls below the above-mentioned threshold value based on a lapse of a predetermined time period from the stop of supply of oxidant-containing gas, thereby switching the first switch 10 to the off state and the second switch 13 to the on state.

As a matter of course, the aforementioned effects obtained in the first preferred embodiment are also achieved by this embodiment.

Fifth Preferred Embodiment

In the present embodiment, FIG. 2 referred to in the first preferred embodiment is employed. With the configuration shown in FIG. 2, the shutdown procedure may be replaced by another one that exerts current control in more detail such as a flow chart shown in FIG. 5. In this case, the step 102 in FIG. 3 is replaced by steps 201 to 205 shown in FIG. 5.

The present embodiment is characterized in that the controller 20 outputs, to the power converter 11, a value obtained by subtracting a predetermined current value from a current command value having been instructed to the power converter 11, as a new current command value, each time the controller 20 detects that the signal S2 output from the voltage detector 31 falls below a predetermined value (a voltage value V1 which will be described later) greater than the operable lower limit voltage value (a threshold value which will be referred to as a voltage value V2 later) of the power converter 11, thereby causing the power converter 11 to execute the constant-current operating function based on the new current command value, and the controller 20 executes control to switch the first switch 10 from the on state to the off state and the second switch 13 from the off state to the on state after one of new current command values obtained by successively performing the aforementioned subtraction falls below a predetermined lower limit command value (a current value A2 which will be described later) or after the signal S2 falls below the operable lower limit voltage value of the power converter 11.

Figure 5:
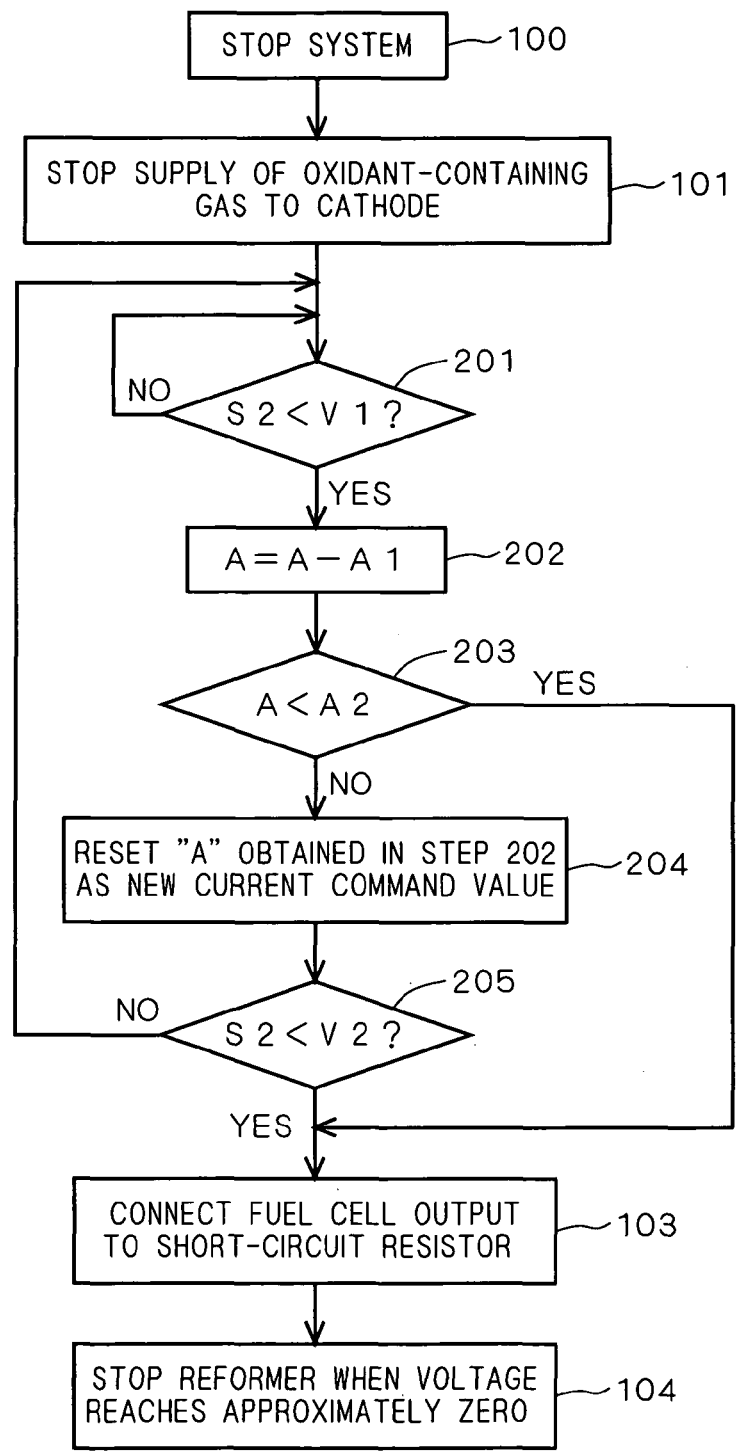
FIG. 5 is a flow chart showing the procedure for shutting down the fuel cell system according to the fifth preferred embodiment.

The above characteristics of the present embodiment will now be shown explicitly by describing the respective steps of the flow chart shown in FIG. 5.

After the start of shutdown procedure (step 100) and the subsequent stop of supply of oxidant-containing gas (step 101) (where the controller 20 instructs an initial value of the current command value for the current value I to the power converter 11 to control the constant-current operating function of the power converter 11, allowing the current value I of the fuel cell stack 1 to be kept at the command value after starting the shutdown mode while the output voltage value V of the fuel cell stack 1 is kept dropping), the controller 20 receives the signal S2 from the voltage detector 31, and compares the value of the signal S2 with the predetermined value V1 (greater than the operable lower limit voltage value of the power converter 11), thereby detecting whether or not the output voltage of the fuel cell stack 1 falls below the predetermined value V1 (S2<V1) (step 201).

When it is detected in step 201 that the value of the signal S2 falls below the predetermined value V1, the controller 20 makes a calculation A=A−A1 (where A1 is a predetermined constant value) with respect to the current command value A having been instructed to the power converter 11 (step 202), and besides, judges whether a new current command value A obtained by subtracting the constant value A1 from the constant current command value A is not less than a predetermined value A2 which is a practical lower limit (where A<A2) (step 203). When it is judged in step 203 that the relation A≧A2 holds, the controller 20 resets the new current command value A at a current command value to be instructed to the power converter 11 again, and instructs the value to the power converter 11. As a result, the current value I output from the fuel cell stack 1 decreases by the constant value A1, so that the speed of electrochemical reaction in the fuel cell stack 1 is lowered. More specifically, as the concentration of oxidant on the cathode side decreases, residual oxidant is diffused from a conduit and the like to be supplied into the cathode. Therefore, the current value I is reduced to a current value that matches the speed of supply of oxidant (the speed of diffusion of oxidant-containing gas from the conduit and the like), to lower the dropping speed of the voltage value V of the fuel cell stack 1 (step 204). As a result, electricity produced by residual oxygen in the conduit and the like can be consumed in a greater amount in the external load 12. Further, the controller 20 detects whether the value of the signal S2 is not less than the operable lower limit voltage value V2 of the power converter 11 (S2≧V2) (step 205), and when the relation S2≧V2 holds, the process returns to step 201 with a new current command value A, to continue the above-described series of steps.

Thereafter, when it is detected in step 205 that the value of the signal S2 falls below the operable lower limit voltage value V2 of the power converter 11 (S2<V2) or when it is detected in step 203 that the current command value A obtained in step 202 falls below the predetermined value A2 (A<A2), the controller 20 abandons execution of power consumption in the external load 12 through the power converter 11, and switches the switch 10 from the on state to the off state and the switch 13 from the off state to the on state at this time, thereby connecting the output of the fuel cell stack 1 from the power converter 11 to the short-circuit resistor 14 (step 103). Thereafter, power shall be consumed in the short-circuit resistor 14. At the time when the voltage value V output from the fuel cell stack 1 reaches approximately zero, the controller 20 stops the reformer 2 (step 104), to complete the shutdown procedure. The above-mentioned values V1, A1 and A2 are previously set at optimal values by experiments.

With the above configuration and shutdown procedure, oxygen remaining in the conduit and the like on the cathode side can be consumed with more reliability than in the first preferred embodiment and the like. As a matter of course, the aforementioned effects obtained in the first preferred embodiment and the like are similarly achieved by this embodiment.

Note

In FIG. 2, one end of each of the switches 10 and 13 may be connected to the cathode side, rather than the anode side.

While the invention has been shown and described in detail, the foregoing description is in all aspects illustrative and not restrictive. It is therefore understood that numerous modifications and variations can be devised without departing from the scope of the invention.

What is claimed is:

1. A fuel cell system comprising:
   a fuel cell comprising a cathode and an anode;
   an oxidant-containing gas supply path along which an oxidant-containing gas is supplied to said cathode;
   a reformer producing a hydrogen-containing gas from a raw fuel and supplying said hydrogen-containing gas to said anode;
   a power converter comprising an output terminal connected to an external load, and comprising a function of converting an output of said fuel cell to power according to an application as well as a constant-current operating function;
   a first switch connected in series to said power converter;
   a short-circuit resistor;
   a second switch connected in series to said short-circuit resistor; and
   a current-value control section configured to control a current value output from said fuel cell, wherein
   a pair of said power converter and said first switch is connected between said cathode and said anode,
   a pair of said short-circuit resistor and said second switch is also connected between said cathode and anode,
   when stopping electricity production by said fuel cell, said current-value control section
      outputs a current command value to said power converter as well as keeps said first switch on and said second switch off to cause said output of said fuel cell to be consumed in said external load through said power converter during a time period after stopping the supply of said oxidant-containing gas to said cathode while maintaining the supply of said hydrogen-containing gas from said reformer to said anode until an output voltage of said fuel cell is reduced to a constant threshold value, and
      switches said first switch to the off state and said second switch to the on state when said output voltage of said fuel cell falls below said threshold value, and thereafter stops the supply of said hydrogen-containing gas to said anode so as to control the current value output from said fuel cell when said output voltage of said fuel cell is reduced to approximately zero, and the current value control section includes
   a first voltage detector outputting a first signal when an input voltage from said power converter falls below an operable lower limit voltage value of said power converter which corresponds to said constant threshold value, and
   a second voltage detector detecting said output voltage of said fuel cell and outputting the result of detection as a second signal.

2. The fuel cell system according to claim 1, further comprising:
   a controller keeping said first switch on and said second switch off until said first signal output from said first voltage detector is received and switching said first switch to the off state and said second switch to the on state upon receipt of said first signal output from said first voltage detector.

3. The fuel cell system according to claim 2, further comprising:
   the controller comparing said second signal output from said second voltage detector with a predetermined value corresponding to said constant threshold value to keep said first switch on and said second switch off until said second signal output from said second voltage detector reaches said predetermined value, and switching said first switch to the off state and said second switch to the on state when said second signal output from said second voltage detector falls below said predetermined value.

4. The fuel cell system according to claim 1, wherein said current value control section comprises:
   the second voltage detector detecting a drop in said output voltage of said fuel cell after stopping the supply of said oxidant-containing gas and outputting the result of detection as the second signal; and
   a controller outputting said current command value to said power converter to control said constant-current operating function of said power converter as well as receiving said second signal output from said second voltage detector to control said first and second switches, and
   said controller outputs a new current command value obtained by performing subtraction of a predetermined current value from said current command value to said power converter each time said controller detects that said second signal output from said second voltage detector falls below a predetermined value greater than said operable lower limit voltage value of said power converter, thereby causing said power converter to execute said constant-current operating function based on said new current command value, and said controller successively performs said subtraction and switches said first switch to the off state and said second switch to the on state after said new current command value obtained by each subtraction falls below a predetermined lower limit command value or after said second signal output from said second voltage detector falls below said operable lower limit voltage value of said power converter.

* * * * *